(12) United States Patent
Yamaura et al.

(10) Patent No.: US 12,515,926 B2
(45) Date of Patent: Jan. 6, 2026

(54) CONTROL DEVICE, CRANE, AND METHOD FOR CONTROLLING CRANE

(71) Applicants: Tokyo Institute of Technology, Tokyo (JP); TADANO LTD., Kagawa (JP)

(72) Inventors: Hiroshi Yamaura, Tokyo (JP); Yoshiaki Sugai, Tokyo (JP); Kazuya Tanizumi, Kagawa (JP); Hiroki Ichikawa, Kagawa (JP); Shinji Noguchi, Kagawa (JP); Yuji Tadano, Kagawa (JP)

(73) Assignees: Tokyo Institute of Technology, Tokyo (JP); TADANO LTD., Kagawa (JP)

( * ) Notice: Subject to any disclaimer, the term of this patent is extended or adjusted under 35 U.S.C. 154(b) by 143 days.

(21) Appl. No.: 18/556,990

(22) PCT Filed: Mar. 29, 2022

(86) PCT No.: PCT/JP2022/015505
§ 371 (c)(1),
(2) Date: Oct. 24, 2023

(87) PCT Pub. No.: WO2022/230562
PCT Pub. Date: Nov. 3, 2022

(65) Prior Publication Data
US 2024/0217784 A1    Jul. 4, 2024

(30) Foreign Application Priority Data
Apr. 27, 2021    (JP) ................. 2021-075171

(51) Int. Cl.
*B66C 23/58*    (2006.01)
*B66C 23/42*    (2006.01)
(52) U.S. Cl.
CPC .............. *B66C 23/58* (2013.01); *B66C 23/42* (2013.01); *B66C 2700/0371* (2013.01)

(58) Field of Classification Search
CPC ..................................................... B66C 23/58
See application file for complete search history.

(56) References Cited

U.S. PATENT DOCUMENTS

| 12,296,952 B2* | 5/2025 | Sikora .................... B64C 39/024 |
| 2015/0344271 A1* | 12/2015 | Schneider ............... B66C 13/06 |
| | | 701/50 |

(Continued)

FOREIGN PATENT DOCUMENTS

| JP | 4096473 B2 | 6/2008 |
| JP | 2016-120996 | * 12/2014 |

(Continued)

OTHER PUBLICATIONS

Terashima, et al., Minimum Time Control of a Rotary Crane Using the Straight Transfer Transformation Method, 2004 5th Asian Control Conference, (https://ieeexplore.ieee.org/stamp/stamp.jsp?tp=&arnumber=1426895), 2004 (hereinafter "Terashima") (Year: 2004).*

(Continued)

*Primary Examiner* — Jean Paul Cass
(74) *Attorney, Agent, or Firm* — Paratus Law Group, PLLC

(57) ABSTRACT

This crane control device controls the operation of a boom and a winch and transports a load from a start point to an end point, the control device comprising: an acquisition unit that acquires position information of the start point and position information of the end point; a horizontal trajectory generation unit that, by using an optimal control theory, generates a horizontal trajectory for a distal-end part of the boom as represented by a horizontal-direction component of a straight line linking the start point and the end point; a movement trajectory generation unit that generates a trajectory of movement of the boom for transporting the load so as to follow the horizontal trajectory, and a trajectory of rotational movement of the winch; and a movement control (Continued)

unit that controls the boom and the winch based on the trajectory of movement of the boom and the winch.

9 Claims, 17 Drawing Sheets

(56) References Cited

U.S. PATENT DOCUMENTS

2018/0339886 A1  11/2018  Hashimoto et al.
2024/0217784 A1* 7/2024  Yamaura ................ B66C 13/48

FOREIGN PATENT DOCUMENTS

| JP | 2016-120996 | A | 7/2016 | | |
|---|---|---|---|---|---|
| JP | 2017-206351 | | * 11/2017 | | |
| JP | 2017-206351 | A | 11/2017 | | |
| WO | WO-2022230562 | A1 | * 11/2022 | ........... | B66C 13/063 |

OTHER PUBLICATIONS

Machine translation of Japanese Patent Pub. No. JP 2016-120996 A to Nishikawa that was filed in 2014 (Year: 2014).*
Machine translation of of Japanese Patent Pub. No. JP 2017-206351 A to Hashimoto (Year: 2017).*
May 17, 2022 International Search Report for related International application No. PCT/JP2022/015505.
May 17, 2022 International Search Opinion for related International application No. PCT/JP2022/015505.
Shen et al., Minimum Time Control of a Rotary Crane by Using Straight Transfer Transformation Method, SICE Trans. on Industrial Application, 2004, pp. 70-79, vol. 3, No. 10.

* cited by examiner

CONTROL DEVICE, CRANE, AND METHOD FOR CONTROLLING CRANE

CROSS REFERENCE TO PRIOR APPLICATION

This application is a National Stage Patent Application of PCT International Patent Application No. PCT/JP2022/015505 (filed on Mar. 29, 2022) under 35 U.S.C. § 371, which claims priority to Japanese Patent Application No. 2021-075171 (filed on Apr. 27, 2021), which are all hereby incorporated by reference in their entirety.

TECHNICAL FIELD

The present invention relates to a control device, a crane, and a method for controlling the crane.

BACKGROUND ART

There are conventionally known cranes such as a mobile crane and a tower crane. A crane is capable of transporting a load suspended by a hook.

There is a known method for controlling a crane that transports a load linearly in plan view (refer to Patent Literature 1). According to the method, a virtual derricking angular acceleration is calculated with a straight transformation transfer model such that the sway angular acceleration of a load is zero. Then, the slewing angular acceleration and derricking angular acceleration of a boom are calculated by input inverse transformation with the virtual derricking angular acceleration.

Then, based on the slewing angular acceleration and derricking angular acceleration, the slewing movement and derricking movement of the boom are controlled to transport the load, with inhibition of swaying, to the position of an end point.

However, the method does not include, as control targets, a change in the rope length of a wire rope and a change in the height of the load. Thus, in particular, a change in rope length during transport of the load causes a deterioration in the effect of inhibiting swaying at the position of the end point.

Therefore, there have been demands for a crane and a method for controlling the crane that enable, with a change in rope length and a change in the height of a load as control targets, inhibition of the load being transported linearly in plan view from swaying at the position of an end point.

CITATION LIST

Patent Literature

Patent Literature 1: JP 4096473 B2

SUMMARY OF THE INVENTION

Problems to be Solved by the Invention

An object of the present invention is to provide a crane and a method for controlling the crane that enable, based on a change in rope length and a change in the height of a load, inhibition of a load being transported from swaying at the position of an end point.

Solutions to Problems

According to an aspect of the present invention, provided is a control device for a crane that transports a load from a start point to an end point based on control of respective movements of a boom and a winch, the control device including:
 an acquisition unit that acquires position information pertaining to the start point and position information pertaining to the end point;
 a horizontal trajectory generation unit that generates, with an optimal control theory in which frequency weighting of swaying of the load is considered, a horizontal trajectory of a distal-end part of the boom represented by a horizontal component of a straight line linking the start point and the end point;
 a movement trajectory generation unit that generates, for transport of the load along the horizontal trajectory, a trajectory of movement of the boom and a trajectory of rotational movement of the winch; and
 a movement control unit that controls, based on the trajectory of movement of the boom and the trajectory of rotational movement of the winch, respective movements of the boom and the winch.

According to another aspect of the present invention, provided is a crane that transports a load from a start point to an end point based on control of respective movements of a boom and a winch, the crane including the control device described above.

According to another aspect of the present invention, provided is a method for controlling a crane that transports a load from a start point to an end point based on respective movements of a boom and a winch, the method to be performed by a computer with which the crane is equipped, the method including:
 acquiring position information pertaining to the start point and position information pertaining to the end point;
 creating, with an optimal control theory in which frequency weighting of swaying of the load is considered, a horizontal trajectory of a distal-end part of the boom represented by a horizontal component of a straight line linking the start point and the end point;
 generating, for transport of the load along the horizontal trajectory, a trajectory of movement of the boom and a trajectory of rotational movement of the winch; and
 controlling, based on the trajectory of movement of the boom and the trajectory of rotational movement of the winch, respective movements of the boom and the winch.

Effects of the Invention

According to the present invention, provided can be a crane and a method for controlling the crane that enable, with a change in rope length and a change in the height of a load as control targets, inhibition of the load being transported linearly in plan view from swaying at the position of an end point.

DESCRIPTION OF EMBODIMENTS

The technical idea disclosed in the present application can be applied to not only the following embodiments but also other embodiments.

Figure 1:
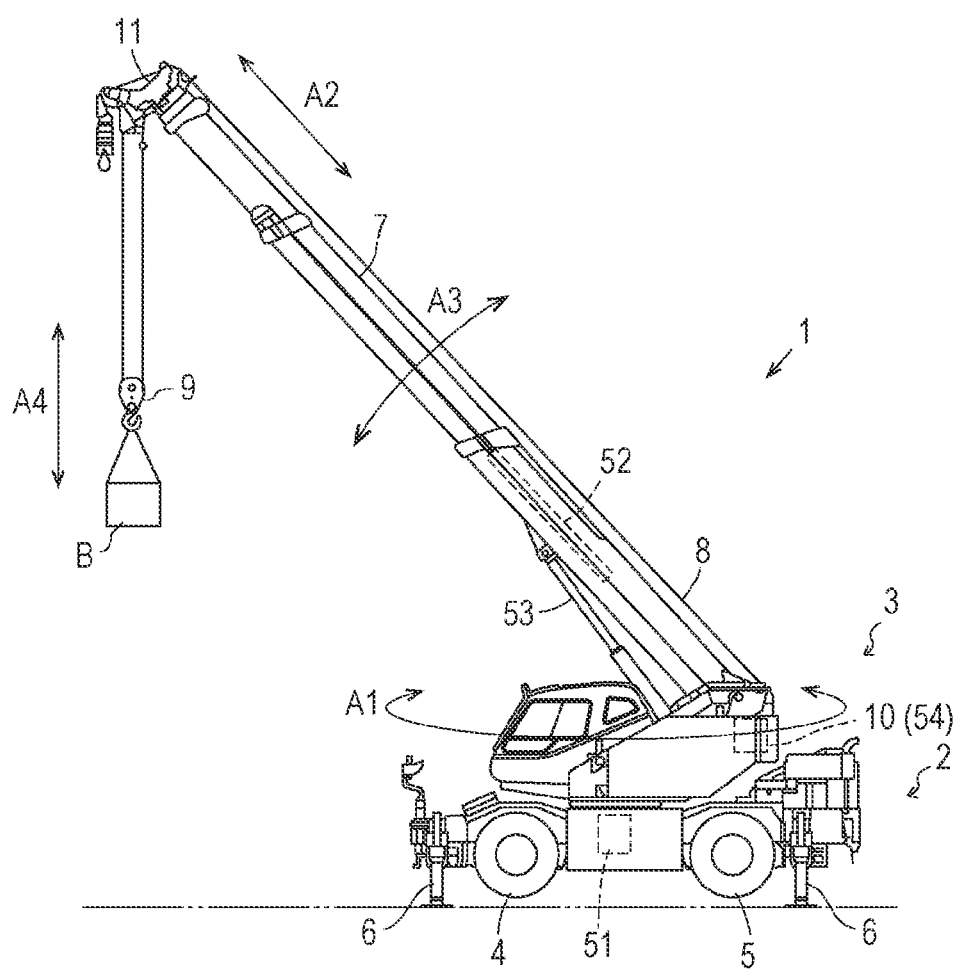
FIG. 1 is an illustration of a crane.

A crane 1 according to a first embodiment will be now described with FIG. 1. Note that, in the present application, the crane 1 will be described as a mobile crane. Note that the present invention can be applied to another type of crane that transports a load suspended by a hook, based on control of the slewing movement and derricking movement of a boom and the rotational movement of a winch by a control device. For example, such another type of crane is a tower crane.

As illustrated in FIG. 1, the crane 1 includes, mainly, a vehicle body 2 and a swivel 3.

The vehicle body 2 includes a lateral pair of front wheels 4 and a lateral pair of rear wheels 5. The vehicle body 2 further includes an outrigger 6 that comes in contact with the ground for stability at the time of transport work of a load B. Note that the vehicle body 2 has an upper portion on which the swivel 3 is supported, and the swivel 3 is capable of slewing due to an actuator.

The swivel 3 supports a boom 7. The boom 7 is capable of slewing based on the power of a hydraulic motor for slewing 51 as an actuator for slewing (refer to a double-headed arrow A1). In addition, the boom 7 is capable of telescopic movement based on the power of a hydraulic cylinder for telescopic movement 52 as an actuator for telescopic movement (refer to a double-headed arrow A2). Furthermore, the boom 7 is capable of derricking movement based on the power of a hydraulic cylinder for derricking movement 53 as an actuator for derricking movement (refer to a double-headed arrow A3).

In addition, the boom 7 has a wire rope 8 stretched thereover. A hook 9 is attached to the wire rope 8 hanging down from the distal-end part 11 of the boom 7 (hereinafter, referred to as a "boom distal-end part 11").

The boom 7 has a proximal end near which a winch 10 is provided. The winch 10 is integrated with a hydraulic motor for winding 54 as an actuator for winding, and reels in or out the wire rope 8, based on the power of the hydraulic motor for winding 54. Thus, the hook 9 is variable in level (refer to a double-headed arrow A4).

Next, a control configuration of the crane 1 will be described with FIG. 2.

Figure 2:
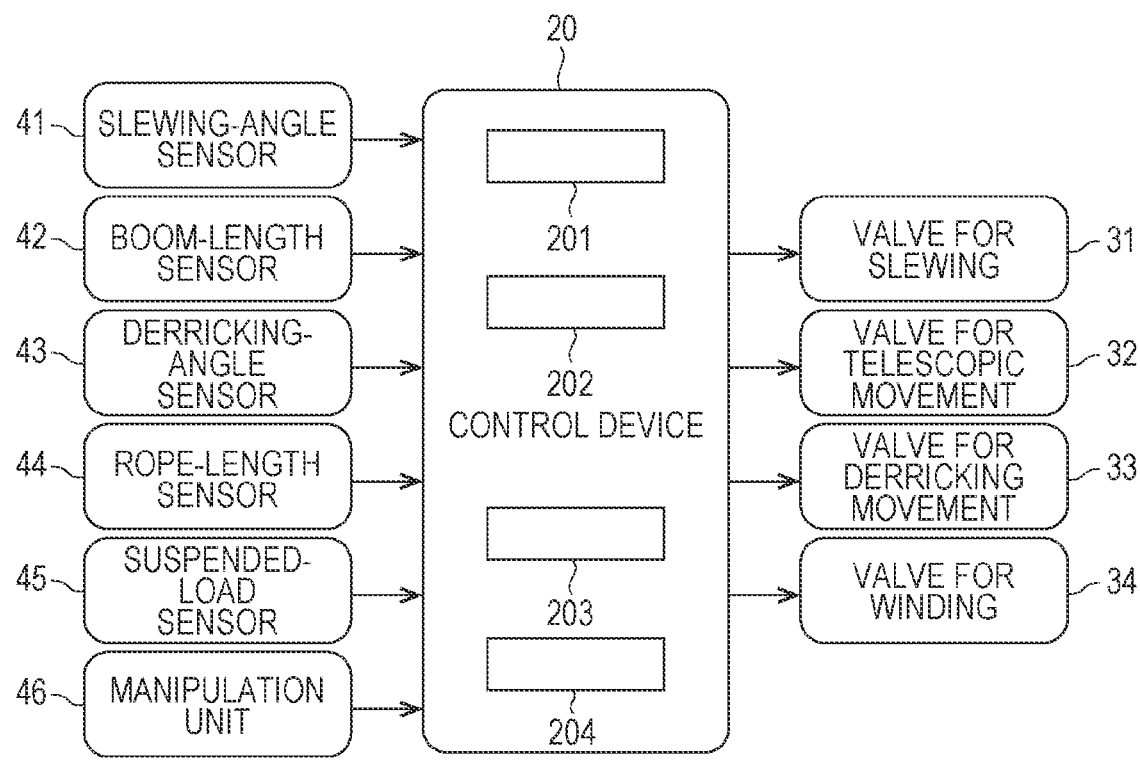
FIG. 2 is an illustration of a control configuration of the crane.

As illustrated in FIG. 2, the crane 1 includes a control device 20. The control device 20 serves as a computer with which the crane 1 is equipped, in which, for example, a CPU, a ROM, a RAM, and an HDD are connected through a bus in practice. Alternatively, the control device 20 may include, for example, a single LSI chip. The control device 20 has various types of manipulation tools (not illustrated) connected thereto. In addition, the control device 20 has various types of valves 31 to 34 connected thereto.

Furthermore, the control device 20 has various types of sensors 41 to 44, in addition to a suspended-load sensor 45, connected thereto. Note that the suspended-load sensor 45 detects the weight of the load B. Thus, the control device 20 can recognize the weight of the load B. The control device 20 calculates the quantity of flexure in the longitudinal direction of the boom 7, based on the weight of the load B.

As described above, the boom 7 is capable of slewing due to an actuator (refer to the double-headed arrow A1 in FIG. 1). In the present application, the actuator is defined as the hydraulic motor for slewing 51 (refer to FIG. 1).

The hydraulic motor for slewing 51 operates appropriately due to a valve for slewing 31 as a directional control valve. That is, the valve for slewing 31 makes a switch in the direction in which operating oil flows, so that the hydraulic motor for slewing 51 operates appropriately.

Note that the valve for slewing 31 operates based on a slewing manipulation tool (not illustrated) manipulated by an operator. A slewing-angle sensor 41 detects the slewing angle of the boom 7. Thus, the control device 20 can recognize the slewing angle of the boom 7 (e.g., the clockwise angle of the boom 7 with respect to the forward direction of the vehicle body 2).

As described above, the boom 7 is capable of telescopic movement due to an actuator (refer to the double-headed arrow A2 in FIG. 1). In the present application, the actuator is defined as the hydraulic cylinder for telescopic movement 52 (refer to FIG. 1).

The hydraulic cylinder for telescopic movement 52 operates appropriately due to a valve for telescopic movement 32 as a directional control valve. That is, the valve for telescopic movement 32 makes a switch in the direction in which operating oil flows, so that the hydraulic cylinder for telescopic movement 52 operates appropriately.

Note that the valve for telescopic movement 32 operates based on a telescopic-movement manipulation tool (not illustrated) manipulated by the operator. A boom-length sensor 42 detects the boom length of the boom 7. Thus, the control device 20 can recognize the boom length of the boom 7.

Furthermore, as described above, the boom 7 is capable of derricking movement due to an actuator (refer to the double-headed arrow A3 in FIG. 1). In the present application, the actuator is defined as the hydraulic cylinder for derricking movement 53 (refer to FIG. 1).

The hydraulic cylinder for derricking movement 53 operates appropriately due to a valve for derricking movement 33 as a directional control valve. That is, the valve for derricking movement 33 makes a switch in the direction in which operating oil flows, so that the hydraulic cylinder for derricking movement 53 operates appropriately.

Note that the valve for derricking movement 33 operates based on a derricking-movement manipulation tool (not illustrated) manipulated by the operator. A derricking-angle sensor 43 detects the derricking angle of the boom 7. Thus, the control device 20 can recognize the derricking angle of the boom 7 (angle of the boom 7 with respect to the horizontal direction).

In addition, as described above, the hook 9 is variable in level due to an actuator (refer to the double-headed arrow A4 in FIG. 1). In the present application, the actuator is defined as the hydraulic motor for winding 54 (refer to FIG. 1).

The hydraulic motor for winding 54 operates appropriately due to a valve for winding 34 as a directional control valve. That is, the valve for winding 34 makes a switch in the direction in which operating oil flows, so that the hydraulic motor for winding 54 operates appropriately.

Note that the valve for winding 34 operates based on a winding manipulation tool (not illustrated) manipulated by the operator. A rope-length sensor 44 detects the length of the wire rope 8 reeled out (hereinafter, referred to as a "delivered length"). Thus, the control device 20 can recognize the delivered length of the wire rope 8.

Note that, based on the derricking angle and the boom length, the control device 20 can calculate a working radius as the distance in the horizontal direction between the slewing center of the swivel 3 and the boom distal-end part 11. Based on the boom length and the delivered length, the control device 20 can calculate a rope length as the length from the boom distal-end part 11 to the load B.

Specifically, for example, the control device 20 adds a previously determined constant corresponding to the length from the hook 9 to the center of gravity of the load B to the length from the boom distal-end part 11 to the hook 9 calculated based on the boom length and the delivered length, to calculate a rope length.

For example, the control device 20 subtracts the rope length from the height from the ground to the boom distal-end part 11 calculated based on the boom length and the derricking angle, to calculate the height from the ground to the center of gravity of the load B.

In addition, the control device 20 has a manipulation unit 46 connected thereto.

The manipulation unit 46 receives, from the operator, a manipulation for operating the crane 1. The manipulation unit 46 includes the slewing manipulation tool, the telescopic-movement manipulation tool, the derricking-movement manipulation tool, and the winding manipulation tool described above.

The manipulation unit 46 further includes an interface for designating a position for the end point and a control start switch. The interface for designating a position for the end point is, for example, a touch-panel monitor or a remote manipulation terminal including a display unit.

The control start switch allows the start of transport of the load B. Based on the manipulation received from the operator through the manipulation unit 46, the control device 20 operates the vehicle body 2 and the swivel 3.

Next, a method for controlling the crane 1 will be described with FIGS. 3 to 10. Note that, in the present description, an XYZ coordinate system, of which the origin O is identical to the slewing center of the crane 1, is prescribed.

Figure 3:
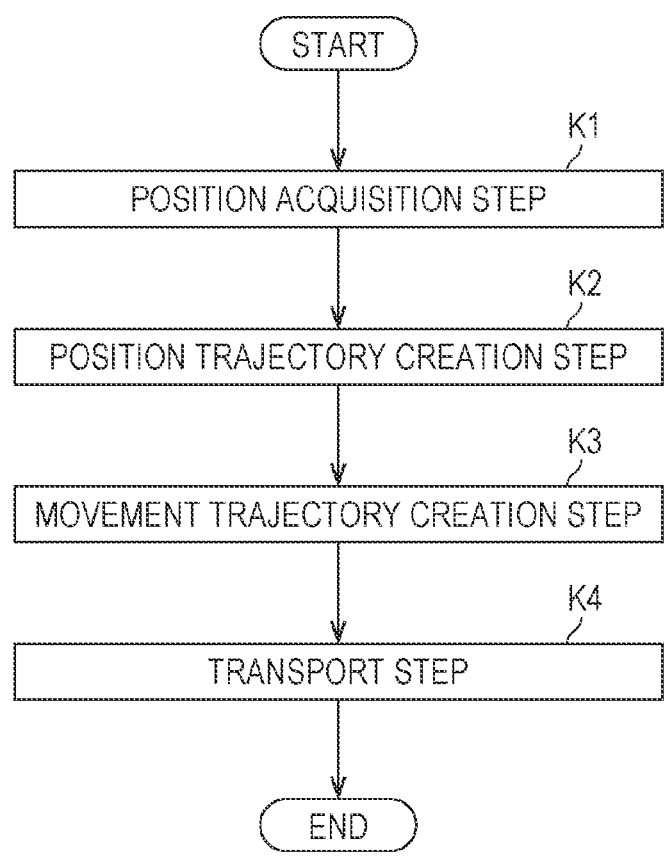
FIG. 3 is an illustration of a flow of processing by a control device.

As illustrated in FIG. 3, the method for controlling the crane 1 according to the first embodiment of the present invention includes a position acquisition step K1, a position trajectory creation step K2, a movement trajectory creation step K3, and a transport step K4. A main device that performs such steps is the control device 20.

Position Acquisition Step

The control device 20 acquires the position of the start point for starting transport of the load B and the position of the end point for terminating the transport of the load B. That is, the control device 20 includes an acquisition unit 201 (refer to FIG. 2) that acquires position information pertaining to the start point for starting transport of the load B and position information pertaining to the end point for terminating the transport of the load B.

Here, the position of the start point is the position of the load B at the start of transport and is indicated, in the present application, with the slewing angle, working radius, and rope length at the start of transport. The position of the end point is the position of the load B at the end of transport and is indicated, in the present embodiment, with the slewing angle, working radius, and rope length at the end of transport.

In acquiring the position of the start point, for example, the control device 20 acquires the slewing angle, boom length, derricking angle, and delivered length from the sensors 41 to 44, respectively. Then, based on the acquired boom length and derricking angle, the control device 20 calculates the working radius at the start of transport. Furthermore, based on the boom length and the delivered length, the control device 20 calculates the rope length.

In acquiring the position of the end point, for example, the control device 20 acquires, from the manipulation unit 46, the slewing angle, working radius, and rope length input by the operator.

Position Trajectory Creation Step

Figure 4:
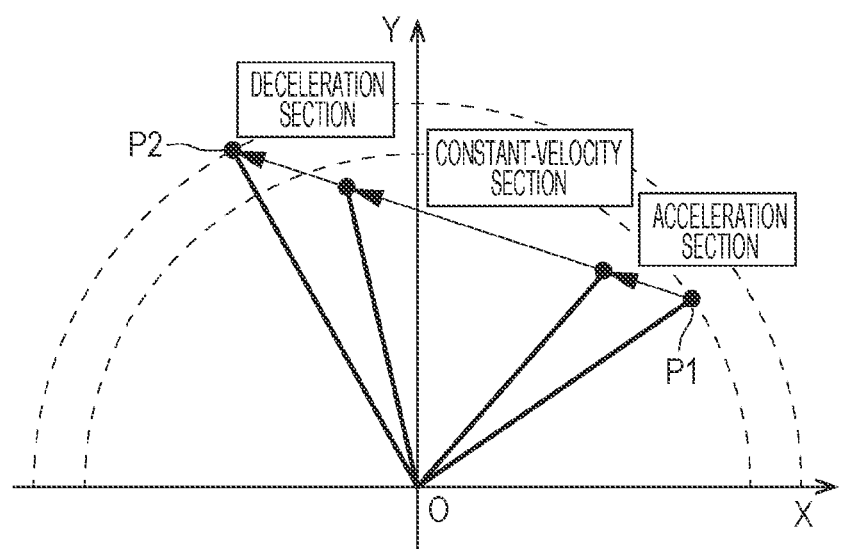
FIG. 4 is an illustration for describing the trajectory of a boom distal-end part that moves linearly in plan view.

With an optimal control theory in which the frequency weighting of swaying is considered, the control device 20 creates the trajectory of the boom distal-end part 11. As illustrated in FIG. 4, the trajectory of the boom distal-end part 11 includes acceleration, constant-velocity, and deceleration sections in this order and extends linearly in plan view. In other words, the trajectory of the boom distal-end part 11 is a horizontal trajectory represented by the horizontal component of a straight line linking a start point P1 and an end point P2. From the start point P1 to the end point P2, the horizontal trajectory is segmented into the acceleration, constant-velocity, and deceleration sections in this order.

That is, the control device 20 includes a horizontal trajectory generation unit 202 (refer to FIG. 2) that generates, with the optimal control theory in which the frequency weighting of swaying of the load is considered, the horizontal trajectory of the distal-end part of the boom represented by the horizontal component of the straight line linking the start point P1 and the end point P2.

Specifically, first, the control device 20 calculates ΔH as the difference in height between the start point P1 and the end point P2. Then, the control device 20 creates, with the optimal control theory in which the frequency weighting of swaying is considered, the trajectory of the boom distal-end part 11 in the XY direction such that the projection of the boom distal-end part 11 moves linearly on an O-XY plane.

In the optimal control theory in the present embodiment, the control device 20 uses the rope length at the start point P1 and the rope length at the end point P2, respectively, in the acceleration section and in the deceleration section.

Figure 5:
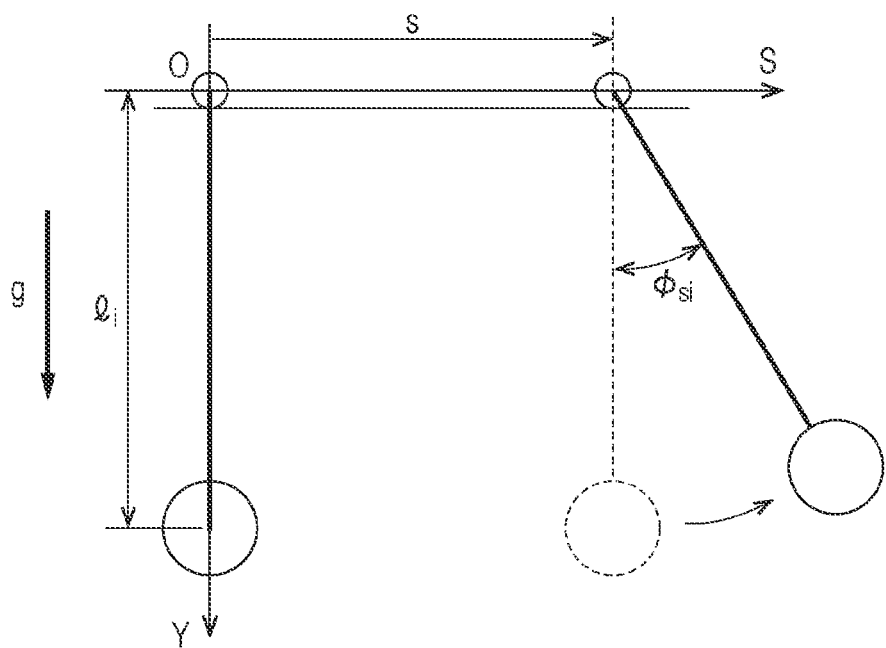
FIG. 5 is an illustration of a model in which the boom distal-end part is simplified.

The optimal control theory will be described in detail below. As illustrated in FIG. 5, in the present application, a simplified model is treated, in which a change in the height of the boom distal-end part 11 due to the derricking movement of the boom 7 is omitted.

That is, in the present application, the boom distal-end part 11 is treated as an overhead crane model. The equation of motion of the model is given by Mathematical Expression 1. s in Mathematical Expression 1 represents the displacement of the boom distal-end part 11. $\varphi_{si}$ represents the sway angle of the load B. $l_i$ represents the rope length. Note that, referring to FIG. 5, the position from which the boom distal-end part 11 starts to move is the origin O. The sway angle of the load B is the angle of the wire rope 8 with respect to the vertical direction.

$$\ddot{\phi}_{si} + \omega_{ni}^2 \phi_{si} = -\frac{\ddot{s}}{l_i} \quad \text{[Mathematical Expression 1]}$$

Here, $\omega_{ni}$ is given by Mathematical Expression 2. g represents the acceleration of gravity.

$$\omega_{ni} = \sqrt{\frac{g}{\ell_i}} \quad \text{[Mathematical Expression 2]}$$

In the present application, treated is an evaluation function in which the frequency weighting of swaying is considered. The evaluation function is given by Mathematical Expression 3.

$$J' = \frac{1}{2}\int_0^{T_c} v(t)^2 dt \quad \text{[Mathematical Expression 3]}$$

Here, v(t) is given by Mathematical Expression 4. s in Mathematical Expression 4 represents the Laplace operator.

$$v(t) = \mathcal{L}^{-1}\{V(s)\} \quad \text{[Mathematical Expression 4]}$$

V(jω) is given by Mathematical Expression 5. The displacement S of the boom distal-end part 11 in Mathematical Expression 5 is a control input, and W(jω) represents a weight function. S (jω) represents the Fourier transform of S(t).

$$V(j\omega) = W(j\omega)S(j\omega) \quad \text{[Mathematical Expression 5]}$$

For example, the weight function W(jω) is treated as a first-order filter type. The weight function W(jω) is given by Mathematical Expression 6. Note that the weight function W(jω) may be a second-order filter type, instead of being a first-order filter type. A second-order filter type of weight function W(jω) enables, at the start of acceleration and at the end of acceleration, a further reduction in the acceleration of the boom distal-end part 11.

$$W(j\omega) = \frac{1 + j\omega\beta}{1 + j\omega\alpha} \quad \text{[Mathematical Expression 6]}$$

Here, α is given by Mathematical Expression 7.

$$\alpha = \frac{1}{\omega_c}\sqrt{\frac{3+\gamma}{1+3\gamma}} \quad \text{[Mathematical Expression 7]}$$

β is given by Mathematical Expression 8.

$$\beta = \gamma\alpha \quad \text{[Mathematical Expression 8]}$$

Figure 6:
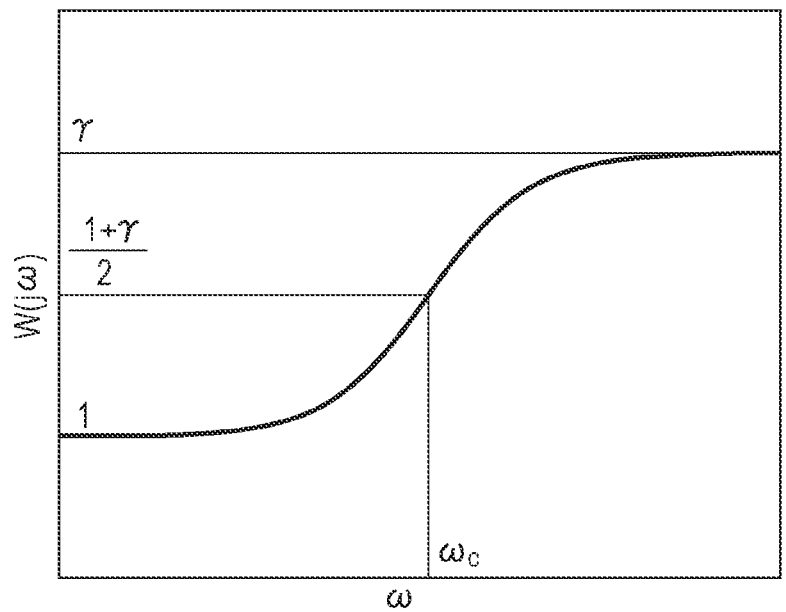
FIG. 6 is an illustration for describing a first-order filter type of weighting function.

FIG. 6 is a Bode plot of Mathematical Expressions 6 to 8 with the horizontal axis and the vertical axis, respectively, as frequency ω and the weight function W (jω). Weight γ is designed to be $\omega_c$ or more. Weighting a high-frequency domain enables inhibition of a high-frequency component from occurring in swaying.

With Mathematical Expressions 5 to 8, the equation of motion in Mathematical Expression 1 is rewritten as in Mathematical Expression 9.

$$\ddot{\phi}_{si} + \omega_{ni}^2 \phi_{si} = -\frac{1}{\ell_i}\frac{\alpha v^2 - (\alpha - \beta)\ddot{z}}{\beta} \quad \text{[Mathematical Expression 9]}$$

Here, the quantity of state z of the filter is given by Mathematical Expression 10.

$$z(t) = \frac{\alpha v(t) - \beta S(t)}{\alpha - \beta} \quad \text{[Mathematical Expression 10]}$$

With Mathematical Expressions 9 and 10 as the condition of constraint, functions v(t), z(t), and S(t) are calculated with Euler's formula such that the evaluation function in Mathematical Expression 3 is minimized, so that the displacement s(t) of the boom distal-end part 11 is given by Mathematical Expression 11. The sway angle $\omega_{si}(t)$ of the load B is given by Mathematical Expression 12.

[Mathematical Expression 11]

$$s(t) = \frac{1}{\ell_i \omega_{ni}^2}\frac{1 + \omega_{ni}^2 \alpha^2}{1 + \omega_{ni}^2 \beta^2}(c_1 \cos\omega_{ni}t + c_2 \sin\omega_{ni}t) +$$

-continued $$\frac{\alpha+\beta}{2}\beta^2 c_3 e^{\frac{t}{\beta}} - \frac{\alpha-\beta}{\beta}c_8 e^{-\frac{t}{\beta}} +$$

$$\frac{1}{6}c_4 t^3 + \frac{1}{2}\{(\alpha-\beta)c_4 + c_5\}t^2 +$$

$$\left\{\frac{\alpha}{\beta}c_6 - \frac{\alpha-\beta}{\beta}(\beta^2 c_4 - \beta c_5 + c_6)\right\}t +$$

$$\frac{\alpha}{\beta}c_7 - \frac{\alpha-\beta}{\beta}(-\beta^2 c_4 + \beta^2 c_5 - \beta c_6 + c_7)$$

[Mathematical Expression 12]

$$\phi_{si}(t) = \frac{1}{\ell_i \omega_{ni}}\left[-\frac{1}{2\ell_i}\frac{1+\omega_{ni}^2 a^2}{1+\omega_{ni}^2 \beta^2}c_1 t\sin\omega_{ni}t + \right.$$

$$\frac{1}{2\ell_i}\frac{1+\omega_{ni}^2 a^2}{1+\omega_{ni}^2 \beta^2}c_2\left(t\cos\omega_{ni}t - \frac{1}{\omega_{ni}}\sin\omega_{ni}t\right) +$$

$$\frac{\alpha+\beta}{2}c_3\frac{1}{\frac{1}{\beta_2}+\omega_{ni}^2}\left\{\omega_{ni}e^{\frac{t}{\beta}} - \frac{1}{\beta}\sin\omega_{ni}t - \omega_{ni}\cos\omega_{ni}t\right\} -$$

$$\frac{\alpha-\beta}{\beta^3}c_8\frac{1}{\frac{1}{\beta^2}+\omega_{ni}^2}\left\{\omega_{ni}e^{-\frac{t}{\beta}} + \frac{1}{\beta}\sin\omega_{ni}t - \omega_{ni}\cos\omega_{ni}t\right\} +$$

$$\frac{c_4}{\omega_{ni}}\left\{t - \frac{1}{\omega_{ni}}\sin\omega_{ni}t + (\alpha-\beta)(1-\cos\omega_{ni}t)\right\} + \frac{c_5}{\omega_{ni}}(1-\cos\omega_{ni}t)\right]$$

$C_k$ (k=1 to 8) in Mathematical Expressions 11 and 12 is the Lagrange undetermined multiplier.

As in Mathematical Expression 13, the initial condition in which time is zero and the terminal condition with termination time To are given, so that $C_k$ (k=1 to 8) is specified. Specifically, solving eighth degree simultaneous equations with eight undetermined multipliers as unknowns calculates $C_k$ (k=1 to 8). V represents the velocity of the boom distal-end part 11 in the constant-velocity section.

$$\phi_{si}(0) = \dot{\phi}_{si}(0) = 0$$ [Mathematical Expression 13]

$$s(0) = \dot{s}(0) = \ddot{s}(0) = 0$$

$$\phi_{si}(T_c) = \dot{\phi}_{si}(T_c) = 0$$

$$\dot{s}(T_c) = V, \ddot{s}(T_c) = 0$$

Figure 7:
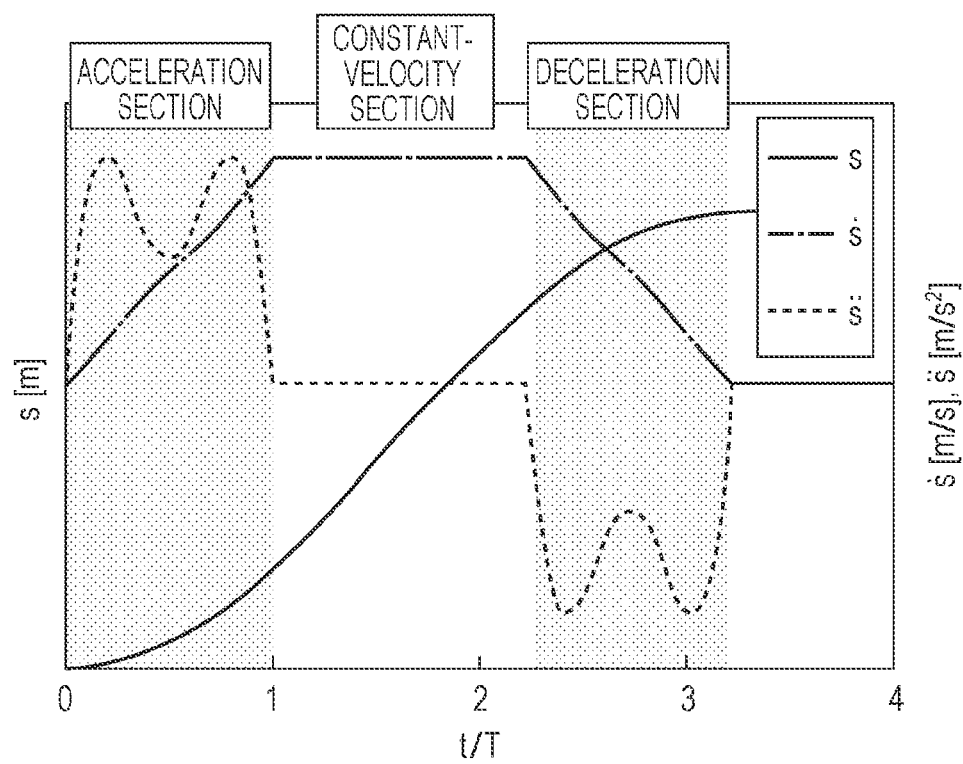
FIG. 7 is an illustration for describing the trajectory of the boom distal-end part.

Note that, as illustrated in FIG. 7, the trajectory of the boom distal-end part 11 in the deceleration section corresponds to the trajectory of transport of the load B due to an inverse manipulation in the acceleration section. That is, the trajectory velocity of the boom distal-end part 11 in the acceleration section is calculated and then is symmetrically flipped with respect to t=$T_c$ (with respect to the vertical line passing through 1 on the horizontal axis in FIG. 7), so that the trajectory velocity of the boom distal-end part 11 in the deceleration section can be calculated. A temporal change in the constant-velocity section enables an adjustment in the distance of movement of the boom distal-end part 11.

Figure 8:
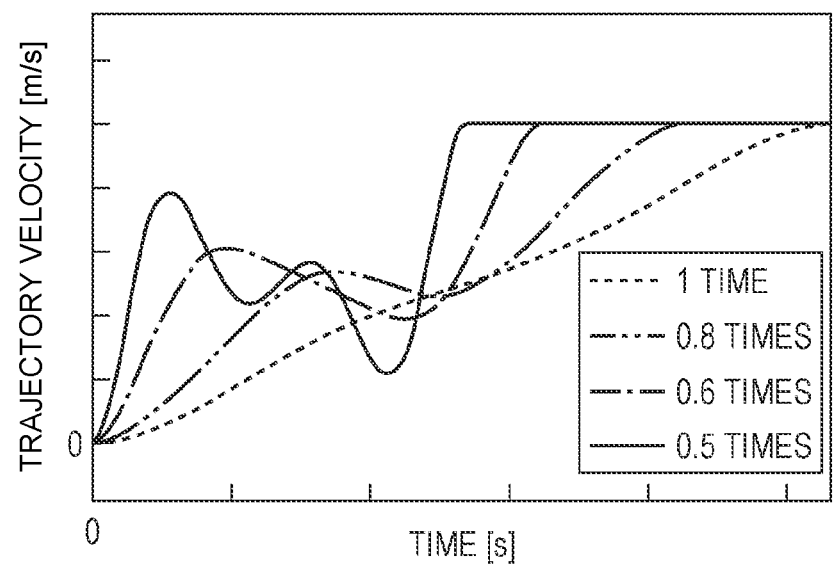
FIG. 8 is an illustration of the velocity waveform of the boom distal-end part for each constant by which the cycle of swaying is multiplied.

FIG. 8 illustrates the velocity waveform of the boom distal-end part 11 calculated by Mathematical Expression 11 with the value of the cycle T of swaying multiplied by a constant. The cycle T of swaying is calculated by Mathematical Expression 2. For example, the constant is 0.5, 0.6, 0.8, or 1.0.

In the acceleration section and the deceleration section, the boom distal-end part 11 moves at the velocity of the calculated velocity waveform, so that a state where no swaying is present can be made after the end of acceleration or after the end of deceleration. That is, shortening the acceleration section and the deceleration section enables a behavior with no swaying to be achieved in a shorter time.

Due to the state where no swaying is present after the end of acceleration, the equilibrium point of force in the constant-velocity section is located in the vertical direction of the boom distal-end part 11 (vertically below the boom distal-end part 11), so that a change can be freely made in the height of the load B with inhibition of swaying.

Note that the constant described above can be set in a range in which an actuator can make a response. In a case where a hydraulic actuator is assumed (e.g., the hydraulic motor for slewing 51 or the hydraulic cylinder for derricking movement 53), 0.5 or more can be set.

Movement Trajectory Creation Step

The control device 20 creates, for transport of the boom distal-end part 11 along the created trajectory, the respective trajectories of slewing movement and derricking movement of the boom 7 and additionally creates, for transport of the load B to the position of the end point P2, the trajectory of rotational movement of the winch 10.

That is, the control device 20 includes a movement trajectory generation unit 203 (refer to FIG. 2) that generates the trajectory of movement of the boom and the trajectory of rotational movement of the winch for transport of the load along the horizontal trajectory of the distal-end part of the boom generated by the horizontal trajectory generation unit 202.

Creation of respective trajectories of slewing movement and derricking movement of the boom 7 will be now described.

Figure 9:
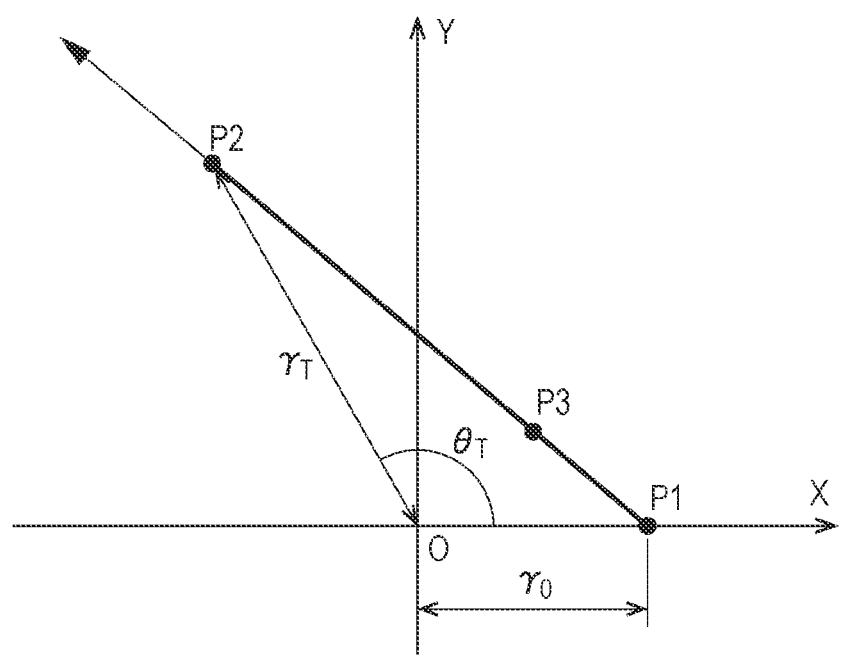
FIG. 9 is an illustration of the trajectory of projection of the boom distal-end part on an O-XY plane.

As illustrated in FIG. 9, the projection of the boom distal-end part 11 on the O-XY plane moves on the line segment linking the start point P1 ($\gamma_0$, 0) and the end point P2 ($\gamma_T \cos\theta_T$, $\gamma_T \sin\theta_T$).

Geometrically, a point P3 (X, Y) on the line segment is given by Mathematical Expression 14. $\gamma_0$ represents the working radius at the start point P1. $\gamma_T$ represents the working radius at the end point P2.

$\theta_T$ represents the slewing angle between the start point P1 and the end point P2.

$$X = \frac{r_T\cos\theta_T - r_0}{\sqrt{r_0^2 + r_T^2 - 2r_o r_T\cos\theta_T}}s + r_0$$ [Mathematical Expression 14]

$$Y = \frac{r_T\sin\theta_T}{\sqrt{r_0^2 + r_T^2 - 2r_o r_T\cos\theta_T}}s$$

The derricking angle $\psi$ and slewing angle $\Theta$ of the boom 7 are given by Mathematical Expression 15, where L represents the boom length and E represents the horizontal length from the boom base fulcrum to the slewing center. The control device 20 creates the trajectories of slewing movement and derricking movement of the boom 7 such that the boom 7 carries out a slewing movement and a derricking movement based on the slewing angle @ and the derricking angle $\psi$ calculated by Mathematical Expression 15.

$$\Psi = \cos^{-1}\left(\frac{\sqrt{X^2+Y^2}+E}{L}\right)$$ [Mathematical Expression 15]

$$\Theta = \cos^{-1}\left(\frac{X}{\sqrt{X^2+Y^2}}\right)$$

Next, creation of the trajectory of rotational movement of the winch 10 will be described. The control device 20 calculates rope-length velocity that is identical to the velocity at which the boom distal-end part 11 moves in the height direction and is directed in a direction opposite to the direction in which the boom distal-end part 11 moves in the height direction such that the load B remains constant in height from the position of the start point P1 (winch velocity pattern) (refer to a solid line R1 in FIG. 14B).

Figure 14A:
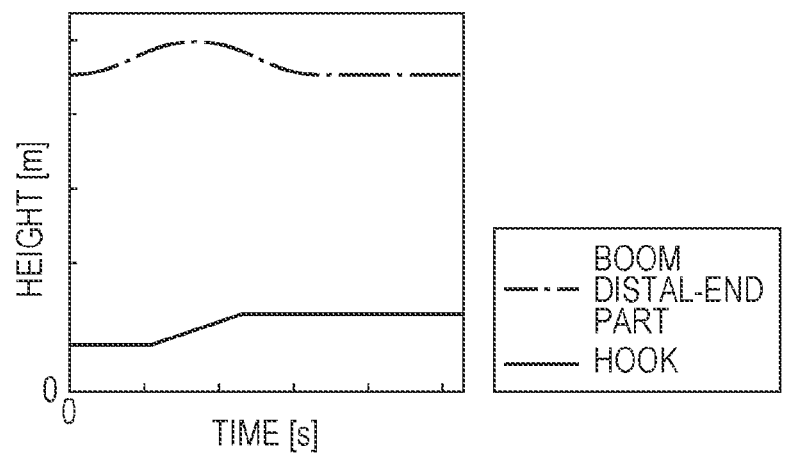
FIG. 14A is an illustration of trajectories in the height direction (Z direction) of the boom distal-end part and a hook.
Figure 14B:
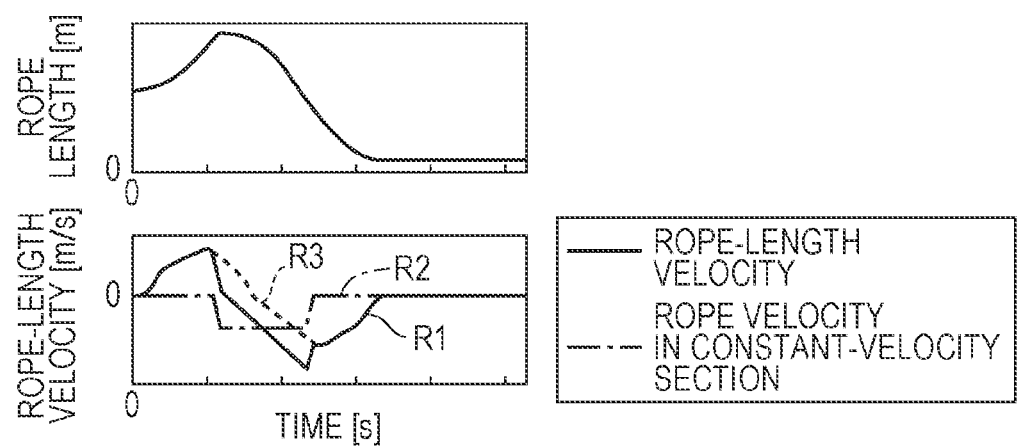
FIG. 14B is an illustration of trajectories of rope length and rope-length velocity.

The control device 20 calculates the rope-length velocity corresponding to ΔH in the constant-velocity section (trapezoidal velocity pattern) (refer to a dot-and-dash line R2 in FIG. 14B). Then, the control device 20 adds the trapezoidal velocity pattern to the winch velocity pattern described above.

The control device 20 creates the trajectory of rotational movement of the winch 10 such that the winch 10 carries out a rotational movement based on the winch velocity pattern resulting from the addition. As above, the control device 20 transports, in the acceleration and deceleration sections, the load B remaining constant in height and transports, in the constant-velocity section, the load B in consideration of a change in height between the start point P1 and the end point P2 and a change in the position of the boom distal-end part 11, so that a state where no swaying is present at the position of the end point P2 can be made promptly.

Figure 10:
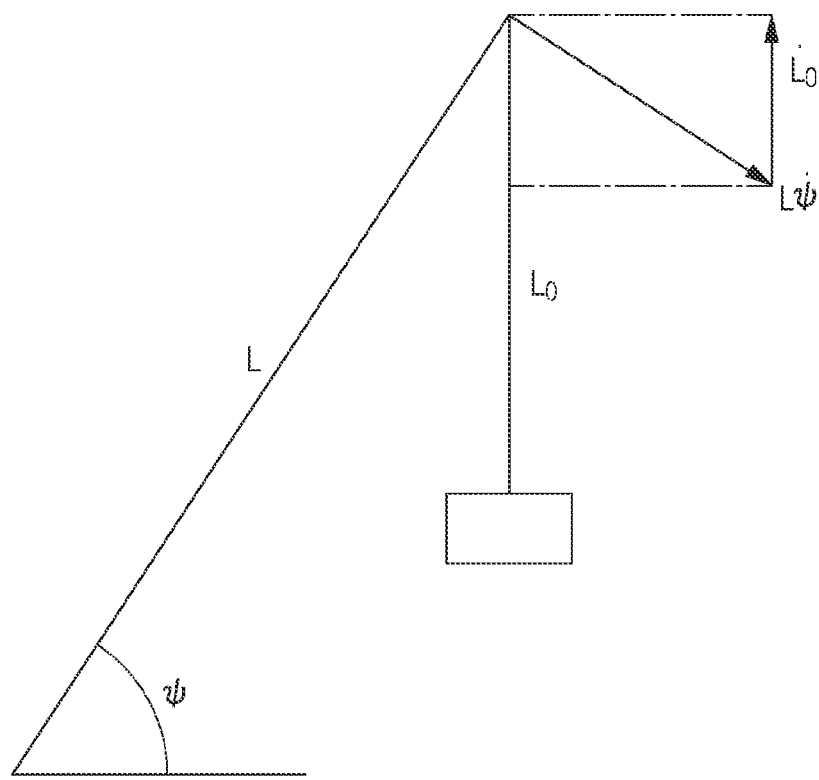
FIG. 10 is an illustration for describing calculation for rope-length velocity.

Note that, in a case where the load B is constant in height, as illustrated in FIG. 10, geometrically, the rope-length velocity $L_0$ is given by Mathematical Expression 16. Derricking angular velocity $\psi$ is calculated due to differentiation of the derricking angle $\psi$ of the crane 1 in Mathematical Expression 15.

$$\dot{L}_O = -L\dot{\Psi}\cos\Psi$$ [Mathematical Expression 16]

Displacement velocity in the height direction due to boom flexure is defined as D, and the rope-length velocity $L_0$ in consideration of the boom flexure is given by Mathematical Expression 17. Note that the trajectory of rope length is calculated due to integration of Mathematical Expression 16 or 17.

$$\dot{L}_O = -L\dot{\Psi}\cos\Psi - \dot{D}$$ [Mathematical Expression 17]

Transport Step

When the operator turns on the control start switch, the control device 20 moves the boom 7 along the trajectories of slewing movement and derricking movement of the boom 7 and additionally moves the winch 10 along the trajectory of rotational movement of the winch 10, to transport the load B.

That is, the control device 20 includes a movement control unit 204 (refer to FIG. 2) that controls, based on the trajectory of movement of the boom and the trajectory of movement of the winch generated by the movement trajectory generation unit 203, the movements of the boom and the winch.

Specifically, the control device 20 operates the valve for slewing 31 along the created trajectory of slewing movement of the boom 7. The control device 20 operates the valve for derricking movement 33 along the created trajectory of derricking movement of the boom 7. Furthermore, the control device 20 operates the hydraulic motor for winding 54 along the created trajectory of rotational movement of the winch 10.

Functional Effect of Embodiment

Figure 11:
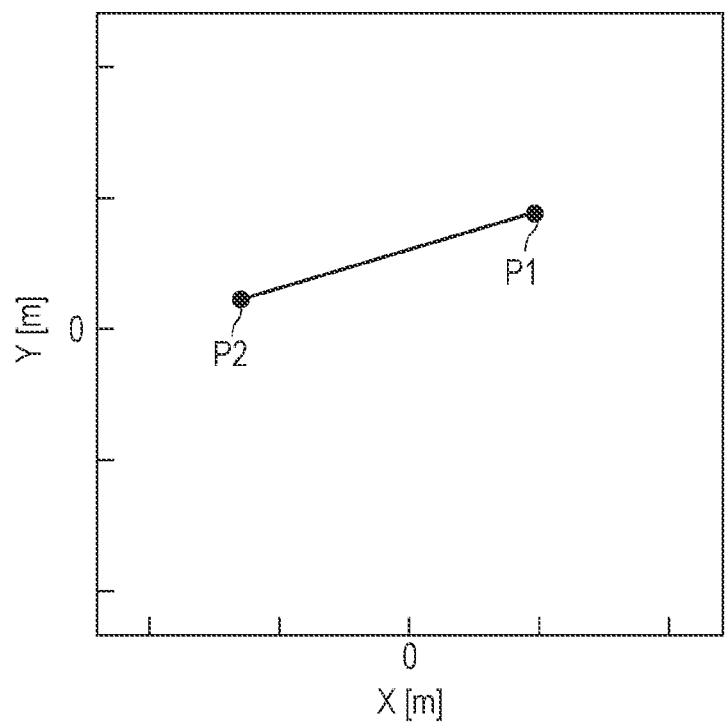
FIG. 11 is an illustration of the trajectory of projection of the boom distal-end part on the O-XY plane.

As illustrated in FIG. 11, assumed is a case where the load B is transported from the start point P1 to the end point P2. The end point P2 is located higher than the start point P1.

Figure 12A:
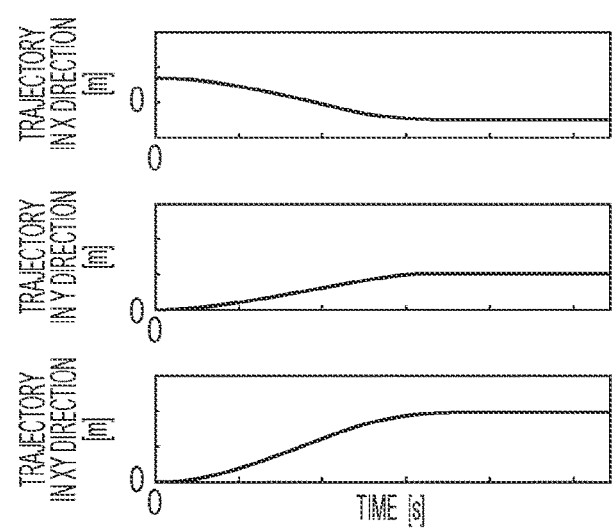
FIG. 12A is an illustration of trajectories of the boom distal-end part in X, Y, and XY directions.
Figure 12B:
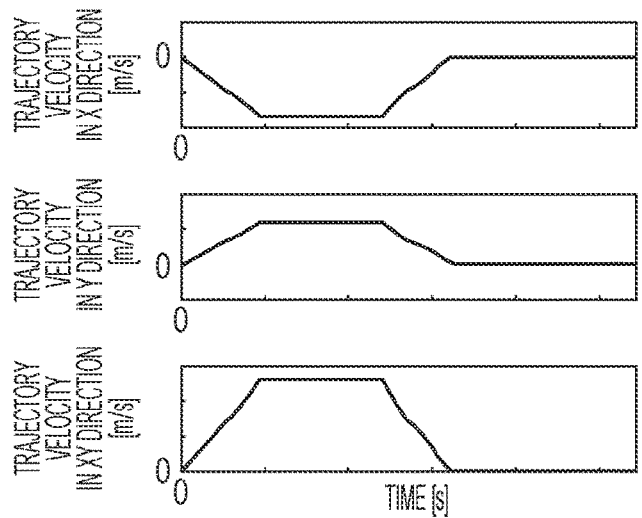
FIG. 12B is an illustration of trajectory velocities of the boom distal-end part in the X, Y, and XY directions.
Figure 12C:
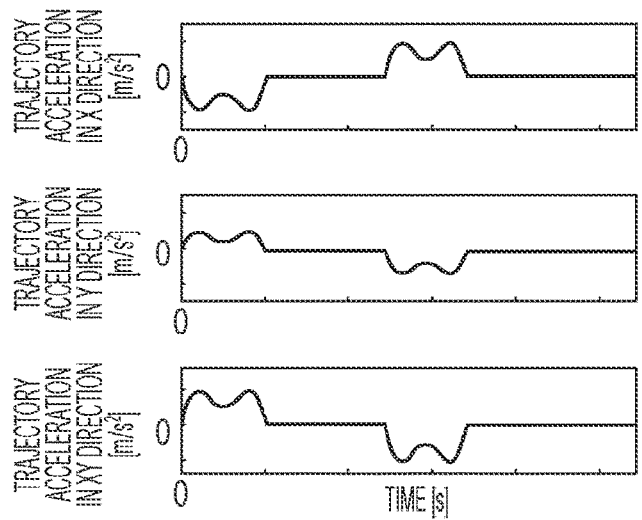
FIG. 12C is an illustration of trajectory accelerations of the boom distal-end part in the X, Y, and XY directions.

As illustrated in FIG. 12A, the control device 20 calculates, with Mathematical Expression 11, the trajectories in the X, Y, and XY directions of the boom distal-end part 11 and further calculates, as illustrated in FIGS. 12B and 12C, the trajectory velocities and trajectory accelerations in the X, Y, and XY directions of the boom distal-end part 11.

Figure 13A:
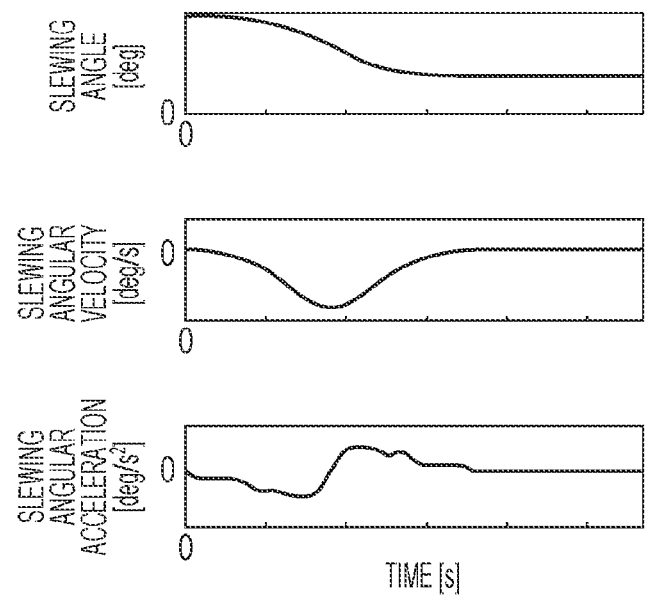
FIG. 13A is an illustration of trajectories of slewing angle, slewing angular velocity, and slewing angular acceleration.

As illustrated in FIG. 13A, the control device 20 calculates the slewing angle of the boom 7 with Mathematical Expression 15 and further calculates the slewing angular velocity and slewing angular acceleration of the boom 7.

That is, the control device 20 creates the trajectory of slewing movement of the boom 7.

Figure 13B:
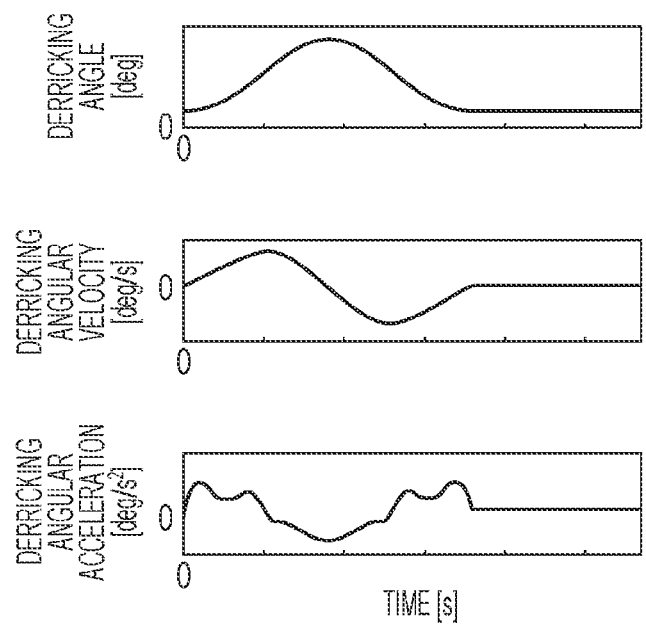
FIG. 13B is an illustration of trajectory of derricking angle, derricking angular velocity, and derricking angular acceleration.

As illustrated in FIG. 13B, the control device 20 calculates the derricking angle of the boom 7 with Mathematical Expression 15 and further calculates the derricking angular velocity and derricking angular acceleration of the boom 7.

That is, the control device 20 creates the trajectory of derricking movement of the boom 7.

As illustrated in FIGS. 14A and 14B, the control device 20 calculates, with Mathematical Expression 17, the rope-length velocity such that the load B is constant in height in the acceleration, constant-velocity, and deceleration sections (winch velocity pattern) (refer to a dotted line R3).

The control device 20 calculates the rope-length velocity corresponding to ΔH in the constant-velocity section (trapezoidal velocity pattern) (refer to the dot-and-dash line R2 in FIG. 14B, the direction of winding up is minus). Then, the control device 20 adds the trapezoidal velocity pattern to the winch velocity pattern described above to calculate the rope-length velocity (refer to the solid line R1 in FIG. 14B). That is, the control device 20 creates the trajectory of rotational movement of the winch 10.

Figure 15A:
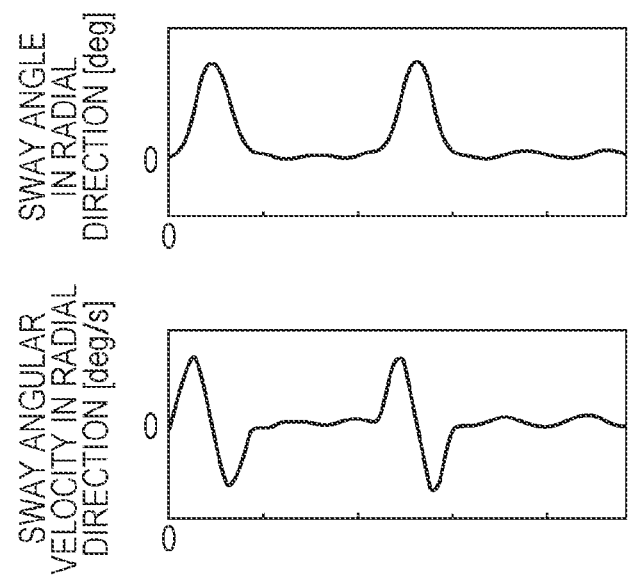
FIG. 15A is an illustration of the sway angle and sway angular velocity of a load in the radial direction.
Figure 15B:
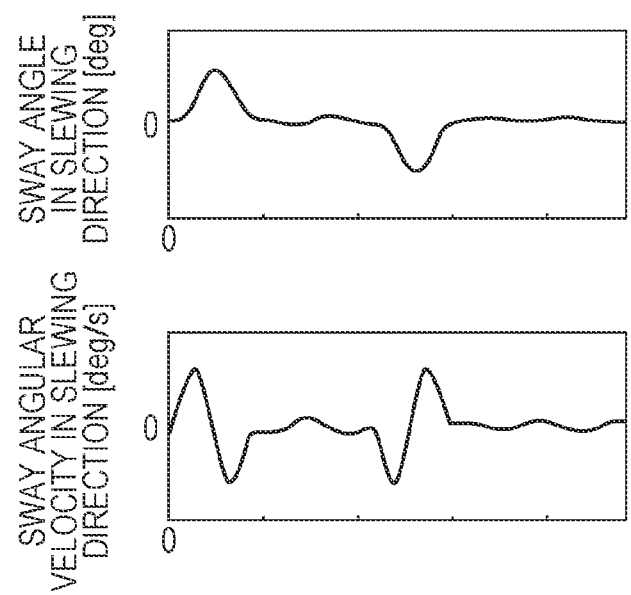
FIG. 15B is an illustration of the sway angle and sway angular velocity of the load in the slewing direction.

The control device 20 moves the boom 7 along the trajectories of slewing movement and derricking movement of the boom 7 and additionally moves the winch 10 along the trajectory of rotational movement of the winch 10. As illustrated in FIGS. 15A and 15B, the control device 20 can transport the load B with inhibition of swaying at the end of transport.

As above, in the method for controlling the crane 1, the rotational movement of the winch 10 is controlled together with the slewing movement and derricking movement of the boom 7. Therefore, with a change in rope length and a change in the height of the load B as control targets, the load B being transported linearly in plan view can be inhibited from swaying at the position of the end point P2. Since the actuators operate along the created trajectories, no sensor that detects the sway angle of the load B is required.

In the method for controlling the crane 1, a change can be freely made in the height of the load B in the constant-velocity section. Therefore, the load B can be transported at any height in the constant-velocity section.

Furthermore, in the method for controlling the crane 1, simultaneously with linear transport of the load B in plan view, the load B is transported in the height direction to the position of the end point P2. Therefore, the load B can be transported more promptly, in comparison to a case where linear transport of the load B in plan view and transport of the load B in the height direction are separately carried out.

In addition, in the method for controlling the crane 1, the trajectory in plan view is directly calculated by the temporal function (Mathematical Expression 11), instead of repetitive calculation. Therefore, a reduction can be made in the load of calculation of the trajectory in plan view.

Next, a method for controlling a crane 1 according to a second embodiment will be described with FIGS. 16A to 17B. Note that, in the following, constituents the same as those in the description for the method for controlling the crane 1 according to the first embodiment are given the same terms denoted with the same reference signs. Differences from the method for controlling the crane 1 according to the first embodiment will be mainly described.

Movement Trajectory Creation Step

A control device 20 creates the trajectory of rotational movement of a winch 10 such that the winch 10 carries out no rotational movement in acceleration, constant-velocity, and deceleration sections. Note that the control device 20 uses, in an optimal control theory in the present embodiment, the rope length due to movement of the rope length at a start point P1 by ΔH, namely, the rope length at an end point P2.

Transport Step

The control device 20 moves the winch 10 before the acceleration section such that a load B is transported by ΔH in the height direction. The control device 20 reels in a wire rope 8 by ΔH in a case where ΔH is positive and reels out the wire rope 8 by ΔH in a case where ΔH is negative. After that, with the rope length remaining constant, the control device 20 moves a boom 7 along the trajectories of slewing movement and derricking movement of the boom 7.

Functional Effect of Embodiment

Figure 16A:
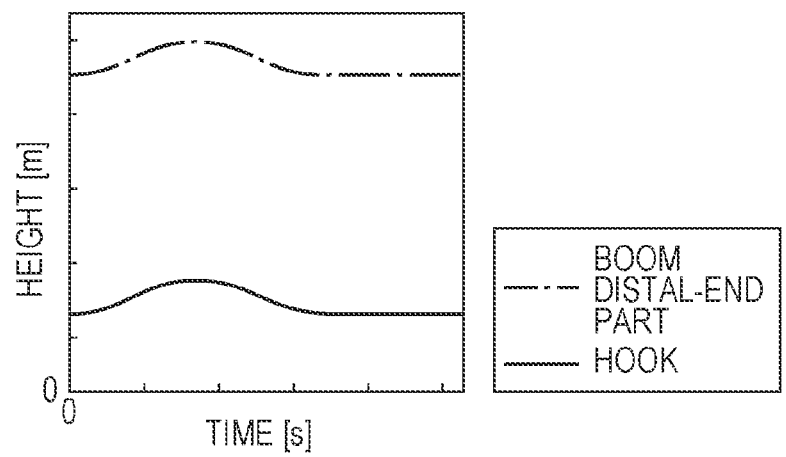
FIG. 16A is an illustration of trajectories in the height direction (Z direction) of a boom distal-end part and a hook.
Figure 16B:
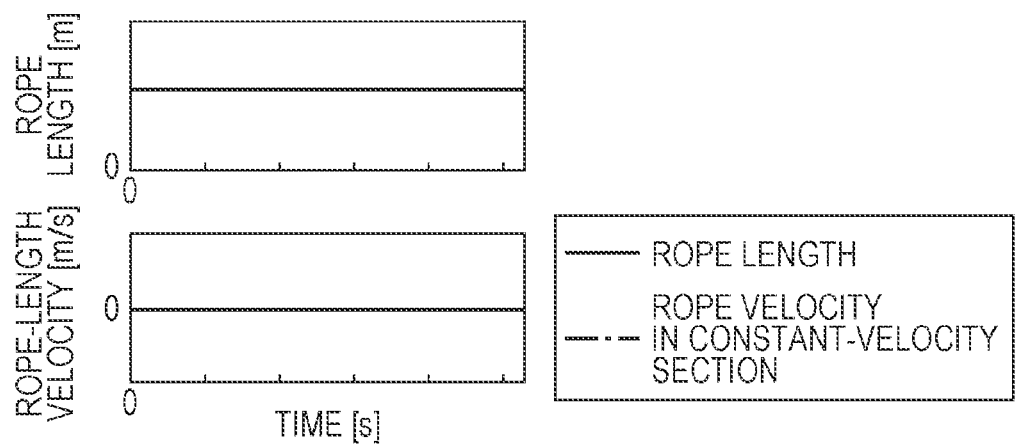
FIG. 16B is an illustration of trajectory of rope length and rope-length velocity.

As illustrated in FIGS. 16A and 16B, the control device 20 creates a winch velocity pattern in which the winch 10 carries out no rotational movement.

Figure 17A:
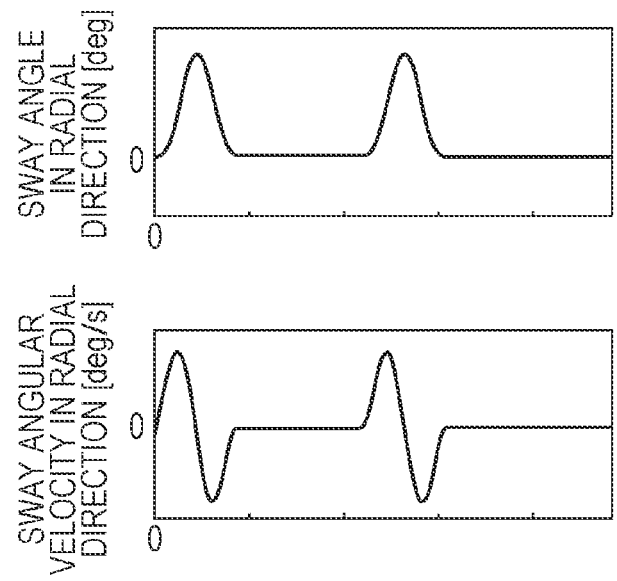
FIG. 17A is an illustration of the sway angle and sway angular velocity of a load in the radial direction.
Figure 17B:
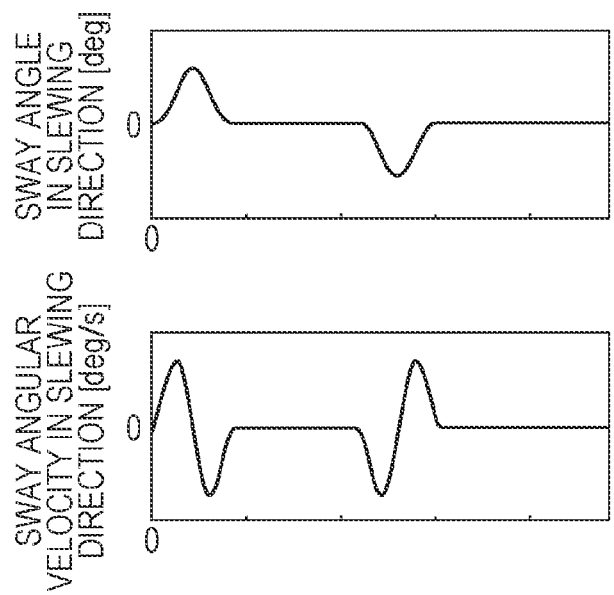
FIG. 17B is an illustration of the sway angle and sway angular velocity of the load in the slewing direction.

The control device 20 moves the boom 7 along the trajectories of slewing movement and derricking movement of the boom 7 and additionally moves the winch 10 along the trajectory of rotational movement of the winch 10. As illustrated in FIGS. 17A and 17B, the control device 20 can transport the load B with inhibition of swaying at the end of transport, in comparison to a case where a change is made in rope length in the constant-velocity section.

As above, in the method for controlling the crane 1, since the load B is transported linearly in plan view with the rope length remaining constant, theoretically, swaying can be perfectly inhibited at the position of the end point P2.

Note that, in each embodiment above, the transport of the load B with the boom 7 has been described. Even for transport of a load with a jib, a similar method enables inhibition of swaying at the position of an end point with linear movement of a jib distal-end part in plan view.

Even for a parallel two-degrees-of-freedom system including a sub-hook, instead of a single-degree-of-freedom system with a main hook, a similar method enables inhibition of swaying at the position of an end point, with linear movement of a boom distal-end part in plan view and prompt transport of a load and without a tangle of a wire rope from which the main hook is suspended and a wire rope from which the sub-hook is suspended.

Furthermore, in a case where a boom has a distal end provided with a load monitoring camera, an operator can input the position of an end point while checking the ambient situation from the image captured by the load monitoring camera.

In addition, the position of a start point and the position of an end point are set as a path for transporting materials designed by building information modeling (BIM), leading to automatic transport.

In addition, although the boom flexure is considered in Mathematical Expression 17, taking account of a change in the velocity of delivered length based on the number of layers on the drum of the winch 10 enables transport of the load B of which the height is kept constant more accurately.

Finally, the invention includes the crane 1 including the control device 20 that can perform the method for controlling the crane 1.

The present crane 1 has an effect similar to the effect described above.

This application is based upon and claims the benefit of priority from Japanese Patent Application No. 2021-075171, filed on Apr. 27, 2021, the entire contents of which are incorporated herein by reference.

INDUSTRIAL APPLICABILITY

The present invention can be applied to various cranes.

REFERENCE SIGNS LIST

1 Crane
2 Vehicle body
3 Swivel
4 Front wheel
5 Rear wheel
6 Outrigger
7 Boom
8 Wire rope
9 Hook
10 Winch
11 Distal-end part of boom (Boom distal-end part)
20 Control device
201 Acquisition unit
202 Horizontal trajectory generation unit
203 Movement trajectory generation unit
204 Movement control unit
31 Valve for slewing
32 Valve for telescopic movement
33 Valve for derricking movement
34 Valve for winding
41 Slewing-angle sensor
42 Boom-length sensor
43 Derricking-angle sensor
44 Rope-length sensor
45 Suspended-load sensor
46 Manipulation unit
51 Hydraulic motor for slewing
52 Hydraulic cylinder for telescopic movement
53 Hydraulic cylinder for derricking movement 54 Hydraulic motor for winding
B Load
K1 Position acquisition step
Position trajectory creation step
K3 Movement trajectory creation step
K4 Transport step
P1 Start point
P2 End point

The invention claimed is:

1. A control device for a crane that transports a load from a start point to an end point based on control of respective movements of a boom and a winch, the control device comprising:
   an acquisition unit that acquires position information pertaining to the start point and position information pertaining to the end point;
   a horizontal trajectory generation unit that generates, with an optimal control theory in which frequency weighting of swaying of the load is considered, a horizontal trajectory of a distal-end part of the boom represented by a horizontal component of a straight line linking the start point and the end point;
   a movement trajectory generation unit that generates, for transport of the load along the horizontal trajectory, a trajectory of movement of the boom and a trajectory of rotational movement of the winch; and
   a movement control unit that controls, based on the trajectory of movement of the boom and the trajectory of rotational movement of the winch, respective movements of the boom and the winch,
   wherein
   the horizontal trajectory is segmented, from the start point to the end point, into an acceleration section, a constant-velocity section, and a deceleration section in order,
   the movement trajectory generation unit creates the trajectory of rotational movement of the winch such that
      the load is transported at a constant height in the acceleration section,
      the load, in the constant-velocity section, is transported in a height direction by a difference in height between the start point and the end point, and
      the load is transported at a constant height in the deceleration section, and
   the acquisition unit, the horizontal trajectory generation unit, the movement trajectory generation unit, and the movement control unit are each implemented via at least one processor.

2. The control device according to claim 1, wherein the trajectory of movement of the boom includes a trajectory of slewing movement of the boom and a trajectory of derricking movement of the boom.

3. The control device according to claim 1, wherein the movement trajectory generation unit creates the trajectory of rotational movement of the winch such that the load is changeable in height in the constant-velocity section.

4. The control device according to claim 1, wherein the movement trajectory generation unit creates the trajectory of rotational movement of the winch such that the winch carries out no rotational movement in the acceleration section, the constant-velocity section, and the deceleration section, and
the movement control unit moves the winch such that, before the acceleration section, the load is transported in a height direction by a difference in height between the start point and the end point.

5. The control device according to claim 1, wherein the horizontal trajectory generation unit generates the horizontal trajectory as a temporal function.

6. A crane that transports a load from a start point to an end point based on control of respective movements of a boom and a winch, the crane comprising the control device according to claim 1.

7. A method for controlling a crane that transports a load from a start point to an end point based on respective movements of a boom and a winch, the method to be performed by a computer with which the crane is equipped, the method comprising:
   acquiring position information pertaining to the start point and position information pertaining to the end point;
   creating, with an optimal control theory in which frequency weighting of swaying of the load is considered, a horizontal trajectory of a distal-end part of the boom represented by a horizontal component of a straight line linking the start point and the end point;
   generating, for transport of the load along the horizontal trajectory, a trajectory of movement of the boom and a trajectory of rotational movement of the winch; and
   controlling, based on the trajectory of movement of the boom and the trajectory of rotational movement of the winch, respective movements of the boom and the winch,
   wherein
   the horizontal trajectory is segmented, from the start point to the end point, into an acceleration section, a constant-velocity section, and a deceleration section in order, and
   the trajectory of rotational movement of the winch is created such that
      the load is transported at a constant height in the acceleration section,
      the load, in the constant-velocity section, is transported in a height direction by a difference in height between the start point and the end point, and
      the load is transported at a constant height in the deceleration section.

8. The method according to claim 7, wherein the trajectory of movement of the boom includes a trajectory of slewing movement of the boom and a trajectory of derricking movement of the boom.

9. The method according to claim 7, wherein the horizontal trajectory is segmented, from the start point to the end point, into an acceleration section, a constant-velocity section, and a deceleration section in order.

* * * * *